US012760853B2

(12) United States Patent
Wang

(10) Patent No.: US 12,760,853 B2
(45) Date of Patent: Oct. 13, 2026

(54) SOLAR WIND-ROTATING LAMP

(71) Applicant: QUANZHOU VIITION GIFTS CO., LTD, Quanzhou (CN)

(72) Inventor: Peijun Wang, Jinjiang (CN)

( * ) Notice: Subject to any disclaimer, the term of this patent is extended or adjusted under 35 U.S.C. 154(b) by 0 days.

(21) Appl. No.: 19/332,637

(22) Filed: Sep. 18, 2025

(65) Prior Publication Data

US 2026/0092685 A1 Apr. 2, 2026

(30) Foreign Application Priority Data

Sep. 29, 2024 (CN) ......................... 202422385228.9

(51) Int. Cl.

| | |
|---|---|
| ***F21S 9/03*** | (2006.01) |
| ***F21V 14/02*** | (2006.01) |
| ***F21V 17/02*** | (2006.01) |
| ***F21V 17/12*** | (2006.01) |
| ***F21V 23/00*** | (2015.01) |
| ***F21V 23/04*** | (2006.01) |
| *F21Y 107/50* | (2016.01) |
| *F21Y 115/10* | (2016.01) |

(52) U.S. Cl.

CPC .............. *F21S 9/032* (2013.01); *F21V 14/02* (2013.01); *F21V 17/02* (2013.01); *F21V 17/12* (2013.01); *F21V 23/002* (2013.01); *F21V 23/04* (2013.01); *F21Y 2107/50* (2016.08); *F21Y 2115/10* (2016.08)

(58) Field of Classification Search

CPC ...... F21S 9/032; F21S 9/03; F21S 9/00; F21S 10/026; F21S 10/007; F21V 17/02; F21V 17/12; F21V 14/02; F21V 23/002; F21V 23/04; A63H 33/40

See application file for complete search history.

(56) References Cited

U.S. PATENT DOCUMENTS 6,551,169 B2 * 4/2003 Jaffe .................... A63H 17/004 446/454
6,893,138 B1 * 5/2005 Jones ...................... F21S 10/06 362/362
8,106,593 B2 * 1/2012 Nevins .................... F21S 8/086 315/159
8,516,743 B1 * 8/2013 Giacomantonio ..... A01G 9/022 47/62 A
9,661,840 B1 * 5/2017 Brain .................... A01M 31/06
9,972,227 B2 * 5/2018 Evans ....................... G09F 7/22

(Continued)

FOREIGN PATENT DOCUMENTS

CN 221243950 U 7/2024

*Primary Examiner* — Daniel I Walsh

(57) ABSTRACT

The present invention relates to the field of solar lamps, and provides a solar wind-rotating lamp. The solar wind-rotating lamp includes a support rod, at least one solar box, and a wind-rotating bracket arranged on the solar box, where at least one lamp source is arranged on the solar box and/or the wind-rotating bracket, a solar assembly is arranged on the solar box. The wind-rotating bracket, the solar box, and the lamp source form a rotating body, a good light effect is achieved in a rotation process, and the whole wind-rotating lamp is stable and not prone to overturning; and the support rod is also not prone to deformation, and higher in aesthetic property of structure, so that technical problems of insufficient aesthetic property and low stability during wind-rotating, of the wind-rotating lamp are solved.

11 Claims, 16 Drawing Sheets

(56) References Cited

U.S. PATENT DOCUMENTS 10,406,420 B2 * 9/2019 Barnhart ............ A63B 71/0036
10,900,650 B2 * 1/2021 Wang .................... F21V 21/108
D974,223 S * 1/2023 Lu ................................ D11/131
D987,154 S * 5/2023 Chen .............................. D26/69
11,788,695 B1 * 10/2023 Hwang ................... F21S 9/037 362/157
D1,018,935 S * 3/2024 Chen .............................. D26/94
D1,020,526 S * 4/2024 Lu ................................ D11/131
2004/0105256 A1 * 6/2004 Jones ..................... A63H 33/22 362/159
2009/0207596 A1 * 8/2009 Richmond .............. F21V 33/00 362/159
2010/0307569 A1 * 12/2010 Sui ......................... A41G 1/002 136/252
2012/0113625 A1 * 5/2012 Werner ..................... F21K 9/20 362/183
2013/0335953 A1 * 12/2013 Gold ....................... F21V 3/026 362/190
2014/0036521 A1 * 2/2014 Elliott ..................... F21S 8/086 362/459
2014/0227940 A1 * 8/2014 Jones ...................... G09F 19/08 446/236
2015/0092399 A1 * 4/2015 Qiu ........................... F21S 9/03 362/183
2016/0223171 A1 * 8/2016 Gibbons ................... H02J 7/35
2017/0089509 A1 * 3/2017 Bailey .................. A01K 45/002
2018/0015384 A1 * 1/2018 Maguire ................ A63H 29/10
2018/0216791 A1 * 8/2018 Leung ..................... F21S 8/006
2018/0358769 A1 * 12/2018 Liao ....................... H01R 39/08
2019/0010319 A1 * 1/2019 King, III ................ C08K 5/103
2019/0360672 A1 * 11/2019 Wang ...................... F21S 9/035
2020/0149260 A1 * 5/2020 Pamula ................... H02S 10/20
2020/0163324 A1 * 5/2020 Towne .................... H02S 40/22
2020/0206648 A1 * 7/2020 Xu ........................ F21V 33/008
2020/0216639 A1 * 7/2020 King, III .................. C08K 3/22
2020/0343852 A1 * 10/2020 Chentnik ................ H02S 20/20
2021/0017959 A1 * 1/2021 Pisharodi ............... B60K 17/22
2022/0085751 A1 * 3/2022 Shin ........................ F21S 8/085
2022/0323878 A1 * 10/2022 Yeiser, IV ................. F03D 1/00
2023/0025229 A1 * 1/2023 Eccard .................. E04H 12/182
2024/0084704 A1 * 3/2024 Jeffus ...................... F03D 9/007
2026/0092685 A1 * 4/2026 Wang ...................... F21S 9/032

* cited by examiner

SOLAR WIND-ROTATING LAMP

CROSS-REFERENCE TO RELATED APPLICATIONS

The present application claims priority to Chinese Patent Application No. 202422385228.9, filed Sep. 29, 2024, the entire disclosure of which is incorporated herein by reference.

TECHNICAL FIELD

The present invention relates to the field of solar lamps, and especially relates to a solar wind-rotating lamp.

BACKGROUND

Existing solar wind-rotating lamp source, solar assembly, lamp source, and wind-rotating bracket are usually arranged at the upper end part of a support rod, the solar assembly, the lamp source, and the wind-rotating bracket have long distances from the lower end part fixed to the ground, and the upper end of the support rod bears a large action force, so that local bending deformation of the support rod is easily caused, and especially in the case of a high wind speed, overturning of the solar wind-rotating lamp is possibly caused, and low stability is caused. The solar assembly and the lamp source are usually fixed to the support rod, and only the wind-rotating bracket rotates, and in the structure, the support rod is single in appearance, and a poor light effect and insufficient aesthetic property are caused.

The Chinese patent application number: 202323176532.4 discloses a luminous wind-rotating lamp, and the luminous wind-rotating lamp includes a transparent pipe, a rotating body, a lamp string, a first limiting piece, a second limiting piece, and a power supply apparatus, where the first limiting piece and the second limiting piece are installed outside the transparent pipe in a sleeved manner and at a distance, the rotating body is rotatably connected to the transparent pipe, and located between the first limiting piece and the second limiting piece, the power supply apparatus is installed on the transparent pipe and located at one side away from the rotating body, of the second limiting piece, the lamp string is located in the transparent pipe and arranged in a length direction of the transparent pipe, the lamp string is electrically connected with the power supply apparatus, and the power supply apparatus is used for supplying power to the lamp string. During wind-rotating of the wind-rotating lamp, the lamp string does not rotate along with the rotating body, so that a poor light effect is caused, the transparent pipe is single in appearance and low in aesthetic property, the wind-rotating lamp is arranged at the top of a bracket, and a support rod bears a large action force, so that local bending deformation of the support rod is easily caused, and especially in the case of a high wind speed, overturning of the solar wind-rotating lamp is possibly caused, and low stability is caused.

SUMMARY

Therefore, with regard to the above problems, the present invention discloses a solar wind-rotating lamp. The technical problems of insufficient aesthetic property and low stability during wind-rotating, of a wind-rotating lamp are solved.

In order to realize the above purpose, the present invention adopts the following technical solution:

a solar wind-rotating lamp includes a support rod, at least one solar box, and a wind-rotating bracket arranged on the solar box, where at least one lamp source is arranged on the solar box and/or the wind-rotating bracket, at least one bearing is arranged on the solar box and/or the wind-rotating bracket, and rotatably arranged on the support rod in a sleeved manner, a solar assembly is arranged on the solar box, and connected with the lamp source, the support rod includes an inner rod, and at least two sleeve rods arranged on the inner rod in a sleeved manner, the bearing can be clamped between the two adjacent sleeve rods, the sleeve rods are fixed to the inner rod through fixing pieces, and wind-rotating blades are arranged on the wind-rotating bracket.

Further:

the bearing is arranged on the solar box, and the wind-rotating bracket is fixed to the solar box.

A decoration is detachably arranged at the top of the support rod, and the fixing piece is arranged at the lower end of the decoration.

A threaded part is arranged at the top of the inner rod, the fixing piece includes a threaded sleeve pipe arranged at the lower end of the decoration, and the threaded sleeve pipe can be arranged on the threaded part in a sleeved manner and through a thread, and can be abutted against the sleeve rod at the lower end.

The decoration is a snowman head, there are two solar boxes and two wind-rotating brackets, and an outer contour of the wind-rotating bracket is of a spherical structure or an ellipsoidal structure.

The sleeve rod at the lowest end of the support rod is non-detachably fixed to the inner rod, and the sleeve rod at the uppermost end of the support rod is clamped and fixed through the fixing piece.

The solar assembly includes a solar cell panel, a storage battery, and a photoresistor, and a switch is further arranged on the solar box.

A first sharp-cone part is arranged at the bottom of the support rod, an L-shaped insertion rod is arranged at the bottom of the support rod, and a second sharp-cone part is arranged at the bottom of the insertion rod.

The wind-rotating bracket includes an upper bracket, a lower bracket, and an installation frame arranged between the upper bracket and the lower bracket, the plurality of wind-rotating blades are connected between the upper bracket and the lower bracket, and the installation frame is fixed to the wind-rotating blades, the upper bracket, or the lower bracket.

A first through hole is formed in the upper bracket, a second through hole is formed in the lower bracket, a third through hole is formed in the installation frame, and the support rod can penetrate through the first through hole, the second through hole and the third through hole.

The wind-rotating blade includes a support bar connected to the upper bracket and the lower bracket, and a rotating blade arranged on the support bar.

At least two installation parts are arranged on each wind-rotating blade, the lamp sources are detachably fixed to the installation parts, and the lamp sources of each wind-rotating blade are respectively connected in series through a lamp wire.

The installation part includes installation holes formed in the wind-rotating blade, the lamp source includes a lamp holder, a lampshade connected to the lamp holder through a thread, and an LED lamp connected to the lamp wire, the lamp wire penetrates through the lamp holder, and the LED lamp is located in the lampshade.

The installation frame includes a plate body, and a plurality of connection rods arranged on the plate body, the connection rods are connected to the wind-rotating blades, at least one first location part is arranged on the connection rod, the lamp wire is fixed to the connection rod through the first location part, a plurality of wire threading holes are formed in the plate body, at least one second location part is arranged on the wind-rotating blade, and the lamp wire is fixed to the wind-rotating blade through the second location part.

In order to realize the above purpose, the present invention further adopts another technical solution:

a solar wind-rotating lamp includes a support rod, at least one solar box, and a wind-rotating bracket arranged on the solar box, where at least one lamp source is arranged on the solar box and/or the wind-rotating bracket, at least one bearing is arranged on the solar box and/or the wind-rotating bracket, a solar assembly is arranged on the solar box, and connected with the lamp source, the support rod includes at least two rod bodies which are detachably connected, the bearing is rotatably fixed between the two rod bodies, and wind-rotating blades are arranged on the wind-rotating bracket and/or the solar box.

Further:

the bearing is arranged on the solar box, and the wind-rotating bracket is fixed to the solar box.

A decoration is arranged at the top of the support rod.

The decoration is a snowman head, there are two solar boxes and two wind-rotating brackets, and the outer contour of the wind-rotating bracket is of a spherical structure or an ellipsoidal structure.

The solar assembly includes a solar cell panel, a storage battery, and a photoresistor, and a switch is further arranged on the solar box.

A first sharp-cone part is arranged at the bottom of the support rod, an L-shaped insertion rod is arranged at the bottom of the support rod, and a second sharp-cone part is arranged at the bottom of the insertion rod.

The wind-rotating bracket includes an upper bracket, a lower bracket, and an installation frame arranged between the upper bracket and the lower bracket, the plurality of wind-rotating blades are connected between the upper bracket and the lower bracket, and the installation frame is fixed to the wind-rotating blades, the upper bracket, or the lower bracket.

A first through hole is formed in the upper bracket, a second through hole is formed in the lower bracket, a third through hole is formed in the installation frame, and the support rod can penetrate through the first through hole, the second through hole and the third through hole.

The wind-rotating blade includes a support bar connected to the upper bracket and the lower bracket, and a rotating blade arranged on the support bar.

At least two installation parts are arranged on each wind-rotating blade, the lamp sources are detachably fixed to the installation parts, and the lamp sources of each wind-rotating blade are respectively connected in series through a lamp wire.

The installation part includes installation holes formed in the wind-rotating blade, the lamp source includes a lamp holder, a lampshade connected to the lamp holder through a thread, and an LED lamp connected to the lamp wire, the lamp wire penetrates through the lamp holder, and the LED lamp is located in the lampshade.

The installation frame includes a plate body, and a plurality of connection rods arranged on the plate body, the connection rods are connected to the wind-rotating blades, at least one first location part is arranged on the connection rod, the lamp wire is fixed to the connection rod through the first location part, a plurality of wire threading holes are formed in the plate body, at least one second location part is arranged on the wind-rotating blade, and the lamp wire is fixed to the wind-rotating blade through the second location part.

In order to realize the above purpose, the present invention further adopts another technical solution:

A solar wind-rotating lamp, comprising a support rod, at least one solar box, at least one wind-rotating bracket, and an electric slip ring connected to the wind-rotating bracket, wherein at least one lamp source is arranged on the wind-rotating bracket and/or the electric slip ring, at least one bearing is arranged on the wind-rotating bracket and/or the electric slip ring, and rotatably arranged on the support rod in a sleeved manner, a solar assembly is arranged on the solar box, and electrically connected with the lamp source through the electric slip ring, at least one clamping part is arranged on the outer wall of the support rod, the bearing is rotatably fixed to the clamping part, and wind-rotating blades are arranged on the wind-rotating bracket and/or the electric slip ring.

Further:

A decoration is arranged at the top of the support rod.

The solar box is arranged on the decoration.

The solar box is arranged on the support rod.

The solar box is arranged in the outside.

The support rod includes an inner rod, and at least two sleeve rods arranged on the inner rod in a sleeved manner, the clamping part is formed between the two sleeve rods, the bearing can be clamped between the two adjacent sleeve rods, and the sleeve rods are fixed to the inner rod through fixing pieces.

The support rod includes at least two rod bodies which are detachably connected, the clamping part is formed between the two rod bodies, and the bearing is rotatably clamped and fixed between the two rod bodies.

The clamping part includes two clamping pieces which are detachably arranged on the support rod, and the bearing is rotatably clamped between the two clamping pieces.

The bearing is located on the electric slip ring.

A first sharp-cone part is arranged at the bottom of the support rod, an L-shaped insertion rod is arranged at the bottom of the support rod, and a second sharp-cone part is arranged at the bottom of the insertion rod.

The wind-rotating bracket includes an upper bracket and a lower bracket, and the plurality of wind-rotating blades are connected between the upper bracket and the lower bracket.

A first through hole is formed in the upper bracket, a second through hole is formed in the lower bracket, and the support rod can penetrate through the first through hole and the second through hole.

The wind-rotating blade includes a support bar connected to the upper bracket and the lower bracket, and a rotating blade arranged on the support bar.

At least two installation parts are arranged on each wind-rotating blade, the lamp sources are detachably fixed to the installation parts, and the lamp sources of each wind-rotating blade are respectively connected in series through a lamp wire.

The installation part includes installation holes formed in the wind-rotating blade, the lamp source includes a lamp holder, a lampshade connected to the lamp holder through a thread, and an LED lamp connected to the lamp wire, the lamp wire penetrates through the lamp holder, and the LED lamp is located in the lampshade.

In order to realize the above purpose, the present invention further adopts another technical solution:

A solar wind-rotating lamp includes a support rod, at least one solar box, and a wind-rotating bracket arranged on the solar box, where at least one lamp source is arranged on the solar box and/or the wind-rotating bracket, at least one bearing is arranged on the solar box and/or the wind-rotating bracket, and rotatably arranged on the support rod in a sleeved manner, a solar assembly is arranged on the solar box, and connected with the lamp source, at least one clamping part is arranged on an outer wall of the support rod, the bearing is rotatably fixed to the clamping part, and wind-rotating blades are arranged on the wind-rotating bracket and/or the solar box.

The clamping part includes two clamping pieces which are detachably arranged on the support rod, and the bearing is rotatably clamped between the two clamping pieces.

A decoration is arranged at the top of the support rod.

The decoration is a snowman head, there are two solar boxes and two wind-rotating brackets, and the outer contour of the wind-rotating bracket is of a spherical structure or an ellipsoidal structure.

The solar assembly includes a solar cell panel, a storage battery, and a photoresistor, and a switch is further arranged on the solar box.

A first sharp-cone part is arranged at the bottom of the support rod, an L-shaped insertion rod is arranged at the bottom of the support rod, and a second sharp-cone part is arranged at the bottom of the insertion rod.

The wind-rotating bracket includes an upper bracket, a lower bracket, and an installation frame arranged between the upper bracket and the lower bracket, the plurality of wind-rotating blades are connected between the upper bracket and the lower bracket, and the installation frame is fixed to the wind-rotating blades, the upper bracket, or the lower bracket.

A first through hole is formed in the upper bracket, a second through hole is formed in the lower bracket, a third through hole is formed in the installation frame, and the support rod can penetrate through the first through hole, the second through hole and the third through hole.

The wind-rotating blade includes a support bar connected to the upper bracket and the lower bracket, and a rotating blade arranged on the support bar.

At least two installation parts are arranged on each wind-rotating blade, the lamp sources are detachably fixed to the installation parts, and the lamp sources of each wind-rotating blade are respectively connected in series through a lamp wire.

The installation part includes installation holes formed in the wind-rotating blade, the lamp source includes a lamp holder, a lampshade connected to the lamp holder through a thread, and an LED lamp connected to the lamp wire, the lamp wire penetrates through the lamp holder, and the LED lamp is located in the lampshade.

The installation frame includes a plate body, and a plurality of connection rods arranged on the plate body, the connection rods are connected to the wind-rotating blades, at least one first location part is arranged on the connection rod, the lamp wire is fixed to the connection rod through the first location part, a plurality of wire threading holes are formed in the plate body, at least one second location part is arranged on the wind-rotating blade, and the lamp wire is fixed to the wind-rotating blade through the second location part.

Through adopting the above technical solution, the beneficial effects of the present invention are that:

the wind-rotating bracket and the lamp source in the present invention form a rotating body that can rotate along the support rod, is good in light effect in a rotation process, and can be arranged at the upper part, the middle part, and the lower part of the support rod, the whole wind-rotating lamp is stable and not prone to overturning during rotation, and the support rod is also not prone to deformation, and higher in aesthetic property of structure; the wind-rotating bracket, the solar box, and the lamp source can be detached from the support rod, so that packaging and transporting are facilitated, and when part of the structure is damaged, only the local structure needs to be replaced, so that a low maintenance cost is achieved; further, the bearing is installed on the solar box, the solar box is high in stability and low in vibration during rotation, and electrical components are not prone to damage; further, the decoration is a snowman head, the two wind-rotating brackets form a snowman body, the whole wind-rotating lamp is in a snowman shape, the upper part, the middle part and the lower part of the whole wind-rotating lamp are supported by the decoration and the two wind-rotating brackets, and the support rod is not deformed, and high in aesthetic property and stability; further, the first sharp-cone part and the second sharp-cone part at the bottom of the support rod can be fixed to the ground, so that a good fixing effect is achieved; further, the wind-rotating blade is in an S shape with the middle part that extends outwards, and the middle part of the wind-rotating blade can be in better contact with wind to realize rotation; further, the lamp wire of each wind-rotating blade is an independent wire, and the lamp wire can be hidden on the wind-rotating blade, so that high aesthetic property is achieved, moreover, the lamp wire is good in fixed effect, and does not need to penetrate through a space between two wind-rotating blades to bear a large wind force, so that the lamp wire bears a small wind force and is not prone to damage; further, the first location part and the second location part can fix the lamp wire, and during rotation, most of the action force of wind is borne by the wind-rotating blades, and the lamp wire does not bear a large wind force; further, the lamp source is convenient and rapid to detach and install, so that installation and maintenance are facilitated; and further, the photoresistor can realize automatic turning-off during the day and turning-on at night.

MARKS OF THE DRAWINGS

Figure 1:
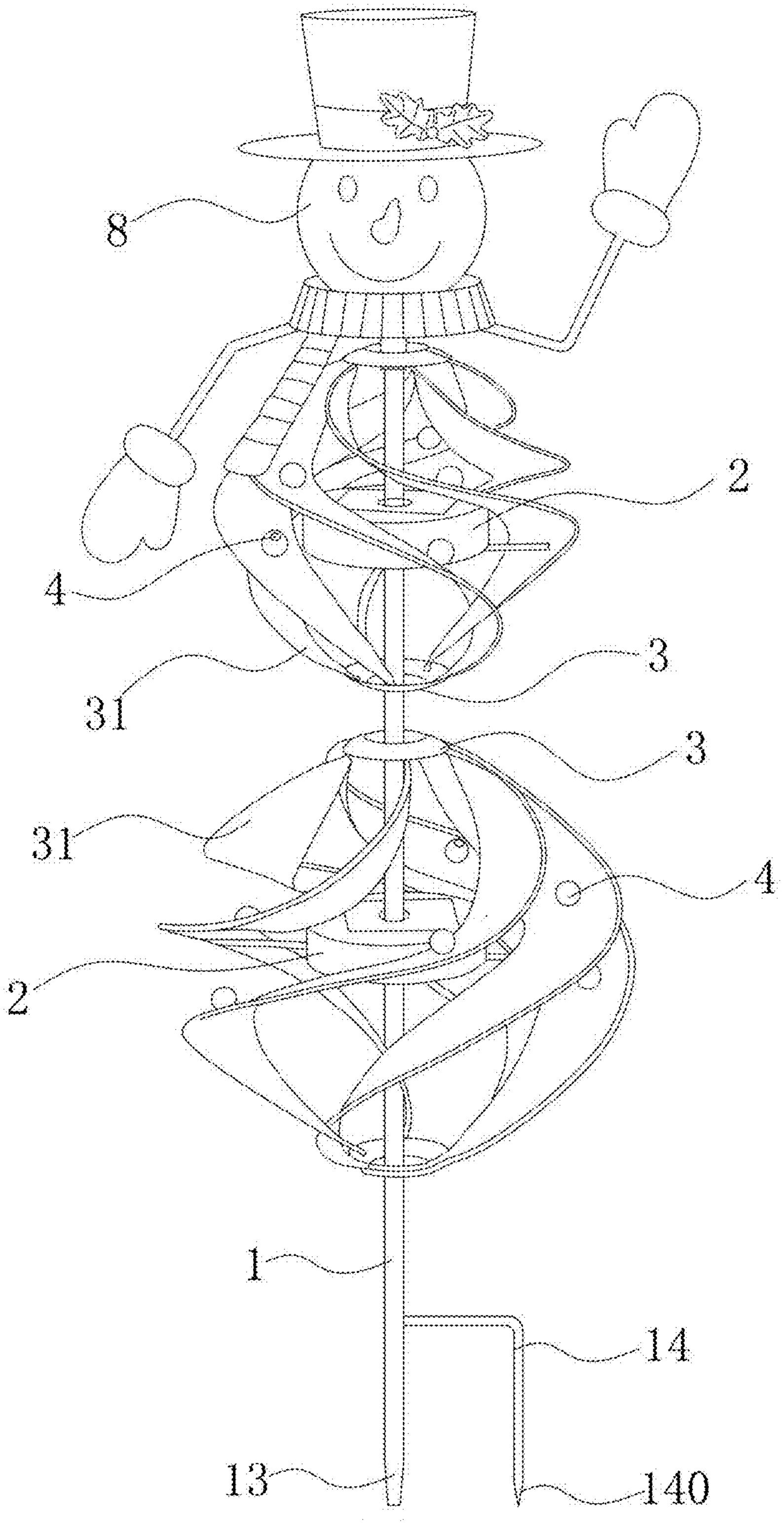
FIG. 1 is a schematic structure diagram of a solar wind-rotating lamp in an example 1.
Figure 2:
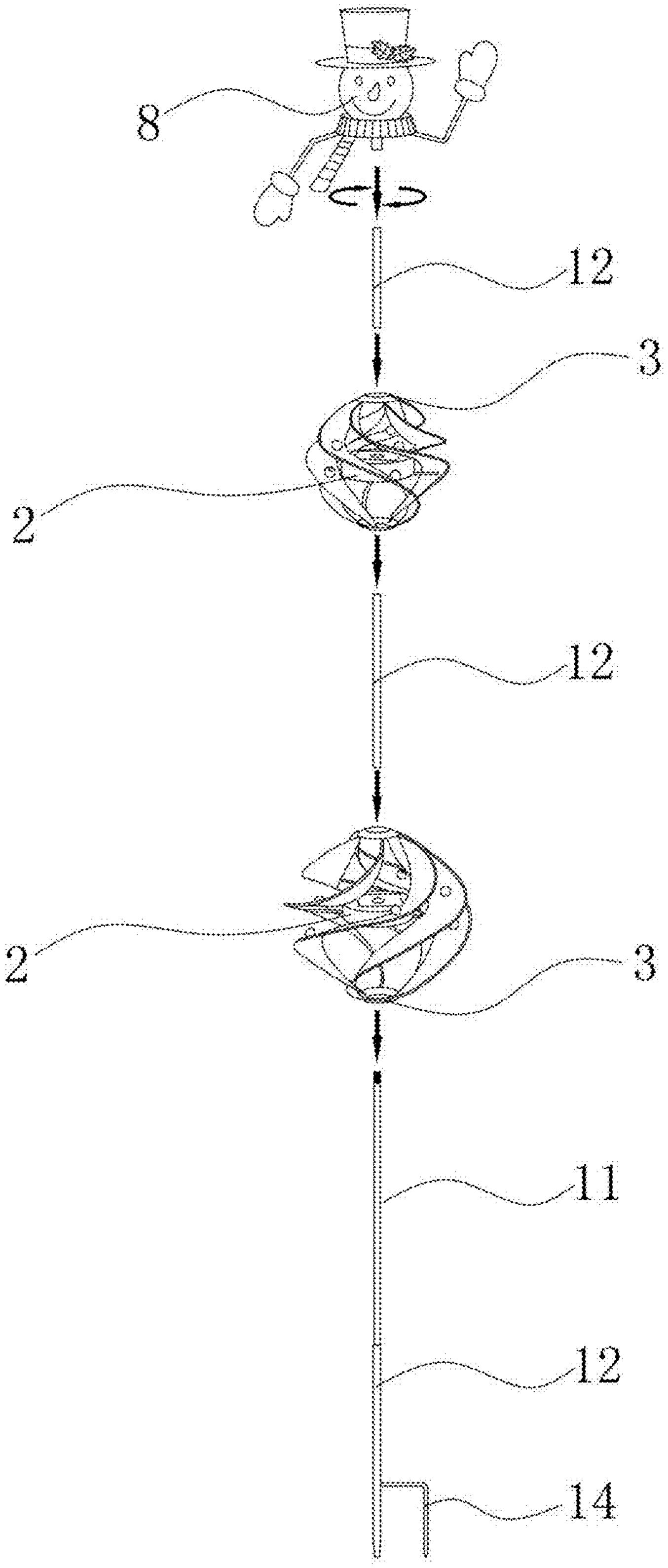
FIG. 2 is an exploded diagram of the solar wind-rotating lamp in the example 1.
Figure 3:
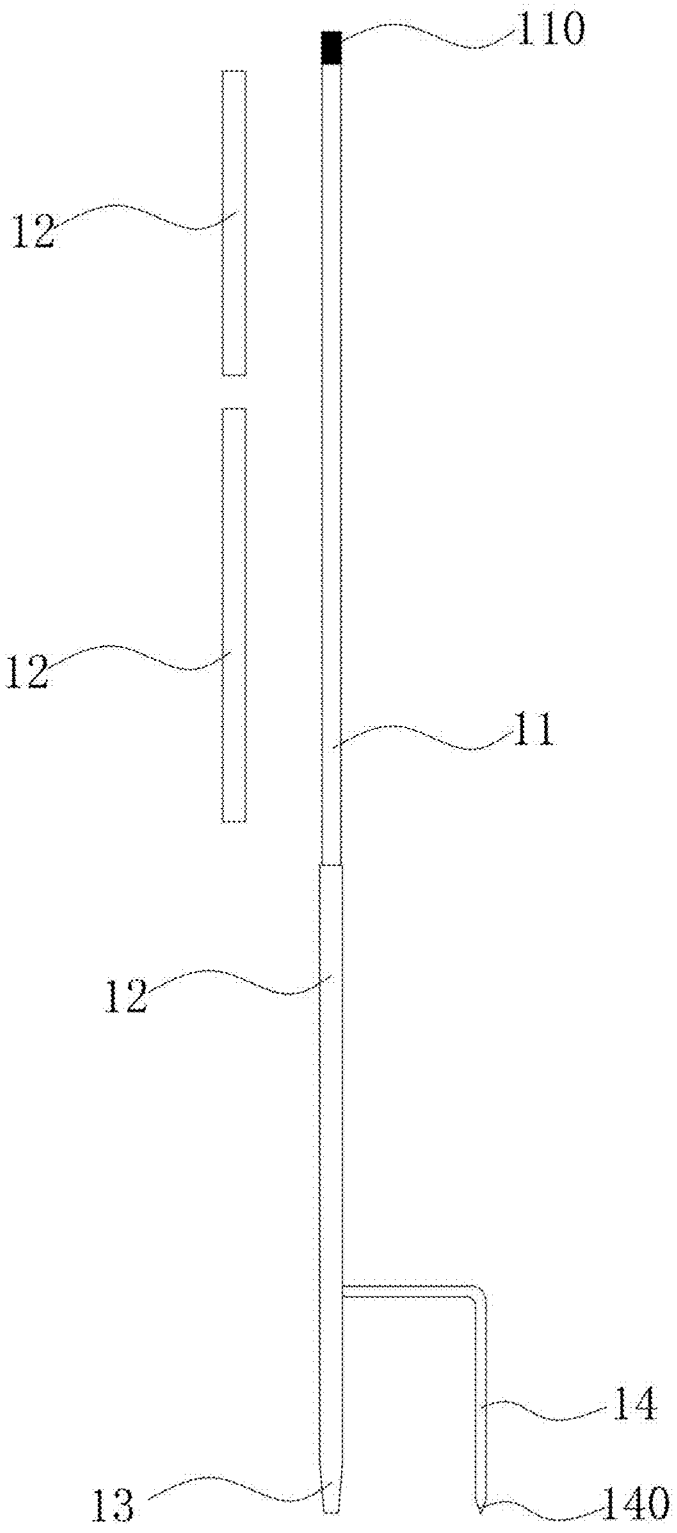
FIG. 3 is an exploded diagram of a support rod in the example 1.
Figure 4:
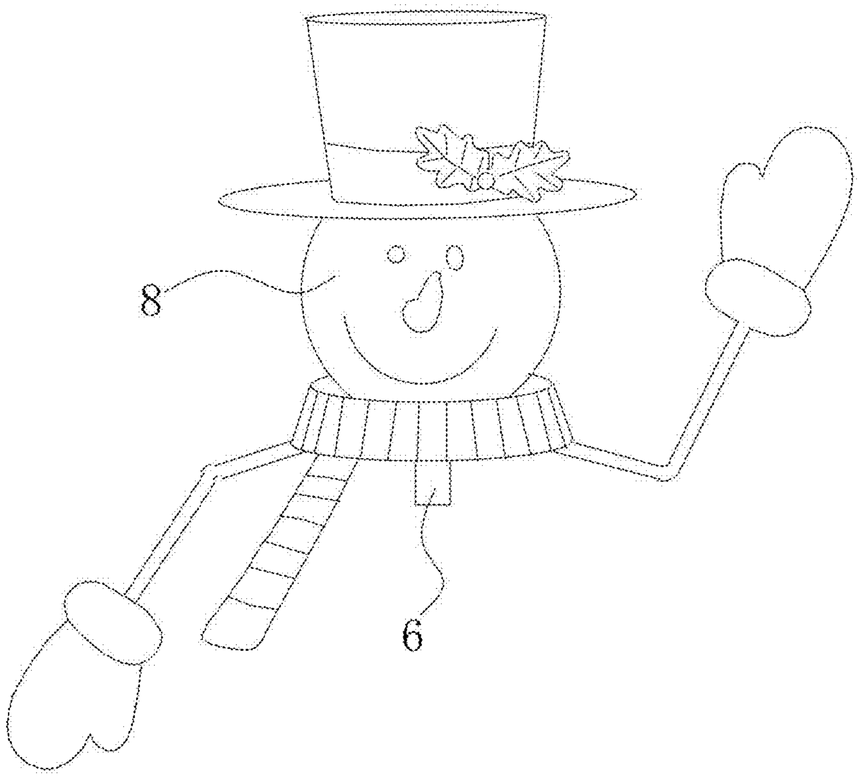
FIG. 4 is a schematic structure diagram of a decoration in the example 1.

1. support rod; 11. inner rod; 110. threaded part; 12. sleeve rod; 13. first sharp-cone part; 14. insertion rod; 140. second sharp-cone part; 15. rod body; 16. clamping piece; 2. solar box; 20. fourth through hole; 21. switch; 3. wind-rotating bracket; 31. wind-rotating blade; 311. support bar; 312. rotating blade; 3121. upper blade; 3122. middle blade; 3123. lower blade; 32. upper bracket; 320. first through hole; 33. lower bracket; 330. second through hole; 34. installation frame; 340. third through hole; 341. plate body; 342. connection rod; 3420. wire slot; 343. first location part; 344. wire threading hole; 4. lamp source; 40. lamp wire; 41. lamp holder; 42. lampshade; 43. LED lamp; 5. solar assembly; 6. fixing piece; 7. bearing; 8. decoration; 9. base; and 10. electric slip ring.

DETAILED DESCRIPTION OF THE EMBODIMENTS

The present invention is further described in conjunction with the drawings and specific implementation manners.

Example 1

Referring to FIG. 1 to FIG. 12, the example 1 provides a solar wind-rotating lamp, and the solar wind-rotating lamp includes a support rod 1, two solar boxes 2 rotatably arranged on the support rod 1, and a wind-rotating bracket 3 fixed to the solar box 2, where wind-rotating blades 31 are arranged on the wind-rotating bracket 3, a plurality of lamp sources 4 are arranged on the wind-rotating bracket 3, a solar assembly 5 is arranged on the solar box 2, and connected with the lamp sources 4, the support rod 1 includes an inner rod 11, and a plurality of sleeve rods 12 arranged on the inner rod 11 in a sleeved manner, the sleeve rod 12 at the lowest end of the support rod 1 is non-detachably fixed to the inner rod 11, and the sleeve rod 12 at the uppermost end of the support rod is clamped and fixed through a fixing piece 6. A bearing 7 is arranged on the solar box 2 and rotatably arranged on the support rod 1 in a sleeved manner, and can be clamped between the two adjacent sleeve rods 12, a decoration 8 is detachably arranged at the top of the support rod 1, and is a snowman head, the fixing piece 6 is arranged at the lower end of the decoration 8, a threaded part 110 is arranged at the top of the inner rod 11, the fixing piece 6 includes a threaded sleeve pipe arranged at the lower end of the decoration 8, and the threaded sleeve pipe can be arranged on the threaded part 110 in a sleeved manner and through a thread, and can be abutted against the sleeve rod 12 at the lower end. The solar assembly 5 includes a solar cell panel and a storage battery, a switch 21 is further arranged on the solar box 2, and a photoresistor is further arranged on the solar box 2. A first sharp-cone part 13 is arranged at the bottom of the support rod 1, an L-shaped insertion rod 14 is arranged at the bottom of the support rod 1, and a second sharp-cone part 140 is arranged at the bottom of the insertion rod 14.

The wind-rotating bracket 3 includes an upper bracket 32, a lower bracket 33, a plurality of wind-rotating blades 31 connected between the upper bracket 32 and the lower bracket 33, and an installation frame 34 arranged between the upper bracket 32 and the lower bracket 33, a first through hole 320 is formed in the upper bracket 32, a second through hole 330 is formed in the lower bracket 33, a third through hole 340 is formed in the installation frame 34, the support rod 1 can penetrate through the first through hole 320, the second through hole 330 and the third through hole 340, the installation frame 34 is fixed to the wind-rotating blades 31, the upper bracket 32, or the lower bracket 33, the solar box 2 is fixed to the wind-rotating bracket 3, and the fixing piece 6 is arranged at the lower end of the decoration 8, and can be fixed to the inner rod 11 and clamp the sleeve rods 12. The wind-rotating blade 31 includes a support bar 311 connected to the upper bracket 32 and the lower bracket 33, and a rotating blade 312 arranged on the support bar 311, the support bar 311 is of an arc-line structure, and the wind-rotating blade 31 is in an S shape with the middle part that extends outwards. Two installation parts are arranged on each wind-rotating blade 31, the lamp sources 4 of each wind-rotating blade 31 are respectively connected in series through a lamp wire 40, the installation frame 34 includes a plate body 341, and a plurality of connection rods 342 arranged on the plate body 341, the connection rods 342 are connected to the wind-rotating blades 31, the installation part includes installation holes formed in the wind-rotating blade 31, the lamp source 4 includes a lamp holder 41, a lampshade 42 connected to the lamp holder 41 through a thread, and an LED lamp 43 connected to the lamp wire 40, the lamp wire 40 penetrates through the lamp holder 41, and the LED lamp 43 is located in the lampshade 42.

In one example, a first location part 343 is arranged on the connection rod 342, the lamp wire 40 is fixed to the connection rod 342 through the first location part 343, and a plurality of wire threading holes 344 are formed in the plate body 341. A second location part is arranged on the wind-rotating blade 31, and the lamp wire 40 is fixed to the wind-rotating blade 31 through the second location part.

The above first location part 343 and the above second location part are the same in structure, and are usually bendable pressing bars, the pressing bar can press the wire, the first location part 343 and the second location part are usually integrally formed with the connection rod 342 and the wind-rotating blades 31, or one end of the pressing bar may be fixed in a welding manner, and the above first location part 343 and the above second location part may also not be arranged.

In one example, the rotating blade 312 includes an upper blade 3121, a middle blade 3122, and a lower blade 3123 which are integrally formed from top to bottom, a cross-sectional area of the upper blade 3121 is gradually reduced in a top direction, and a cross-sectional area of the lower blade 3123 is gradually reduced in a bottom direction. The middle blade 3122 protrudes outwards, due to a larger area of the middle blade 3122, a larger wind force can be accepted, the whole rotating blade 312 mainly relies on an action force of wind acting on the middle blade 3122 to rotate, due to gradual changes in the areas of the upper blade 3121 and the lower blade 3123, when the wind is subjected to flow guide along the upper blade 3121 and the lower blade 3123, the action force is smaller and smaller, and due to the small action force on the upper bracket 32 and the lower bracket 33, higher stability during rotation is achieved. When the wind tilts-blows upwards or downwards, the case of an non-uniform action force of the wind on the whole rotating blade 312 will appear, although the force on the upper blade 3121 or the lower blade 3123 is non-uniform, due to the small action force of the wind on the upper blade 3121 or the lower blade 3123, the structure can greatly reduce the appearance of the case of the non-uniform action force of the wind, and improve stability in a rotation process. In another example, the shape of the above rotating blade 312 may also be a wave shape or shapes of other blades.

Figure 5:
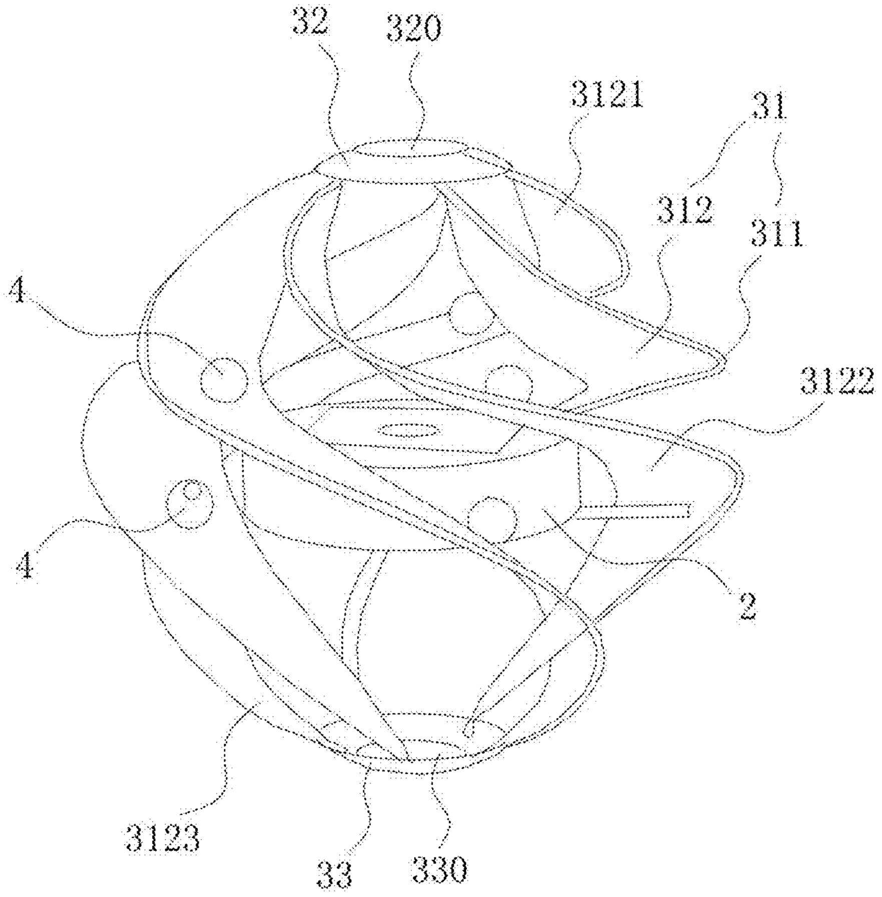
FIG. 5 is a schematic structure diagram of a solar box and a wind-rotating bracket in the example 1.
Figure 6:
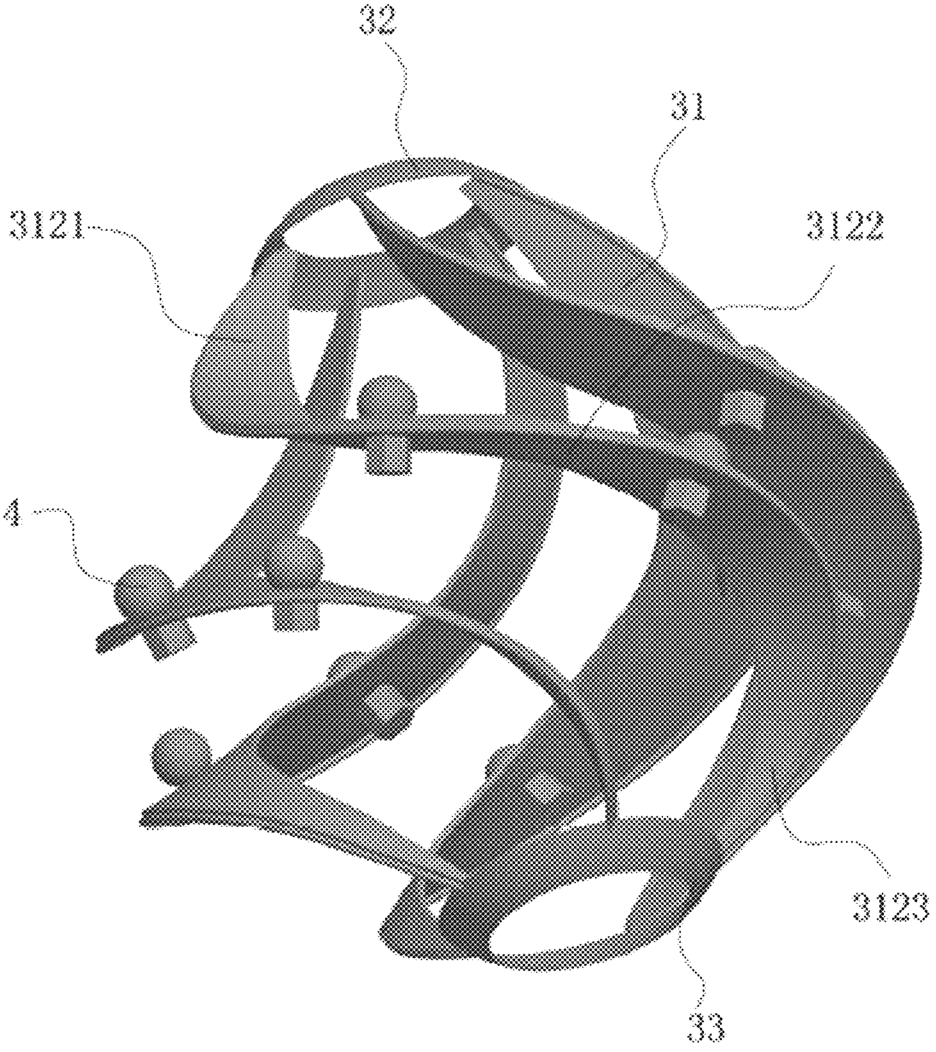
FIG. 6 is a schematic structure diagram of the wind-rotating bracket in the example 1.

Referring to FIG. 5, in one example, the support bar 311 is located at the outer side edge of the rotating blade 312, the outer side edge of the rotating blade 312 receives a larger wind force than the inner side, and the support bar 311 can play a role of better supporting and fixing, so as to prevent the rotating blade 312 from being deformed. In another example, the support bar 311 may also be arranged at the middle part or the inner side edge of the rotating blade 312, but the structure is relatively poor in support effect.

Figure 7:
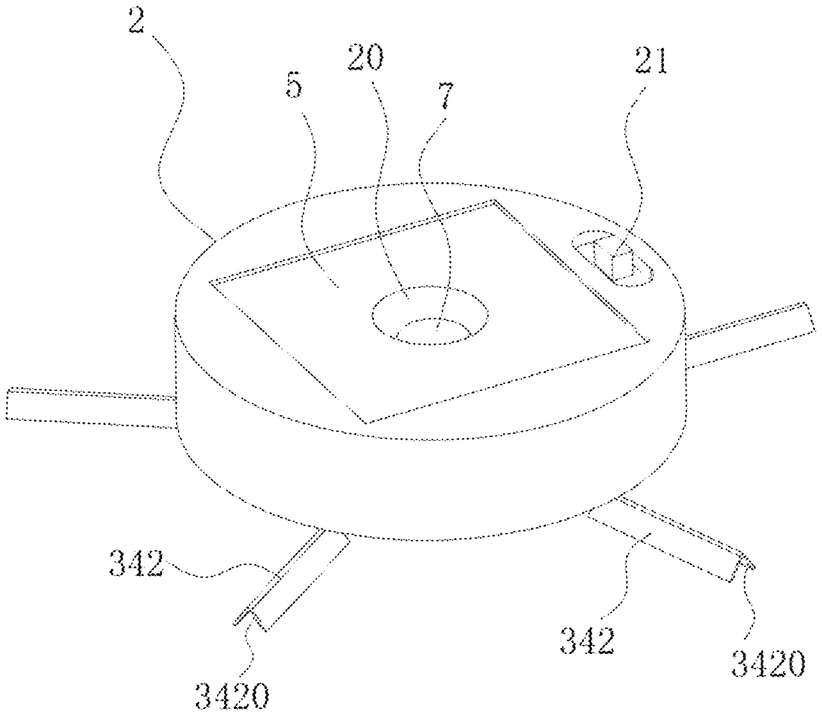
FIG. 7 is a schematic structure diagram of the solar box in the example 1.
Figure 8:
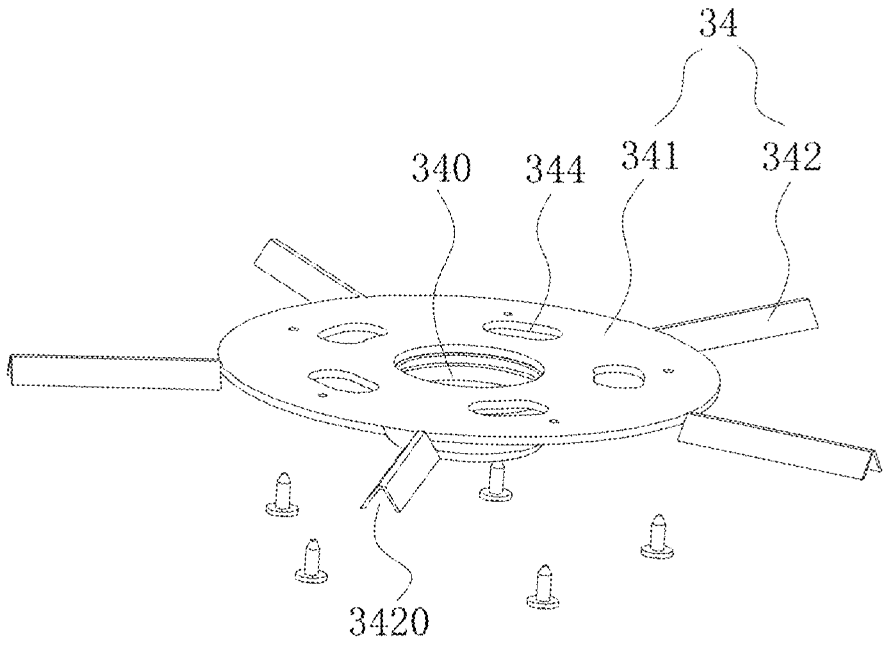
FIG. 8 is a schematic structure diagram of an installation frame in the example 1.
Figure 9:
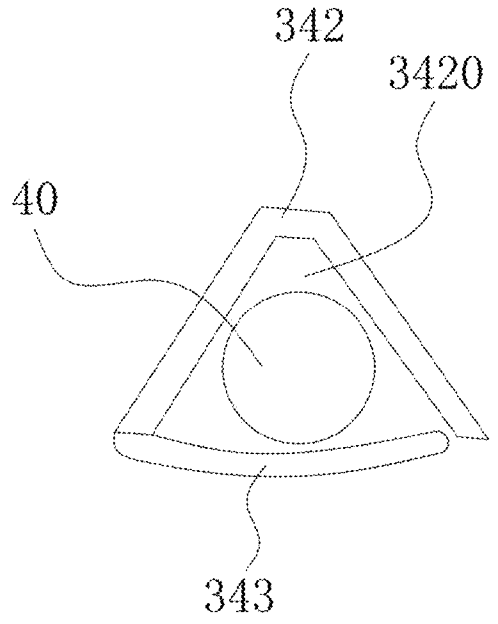
FIG. 9 is a schematic structure diagram of a connection rod in the example 1.
Figure 10:
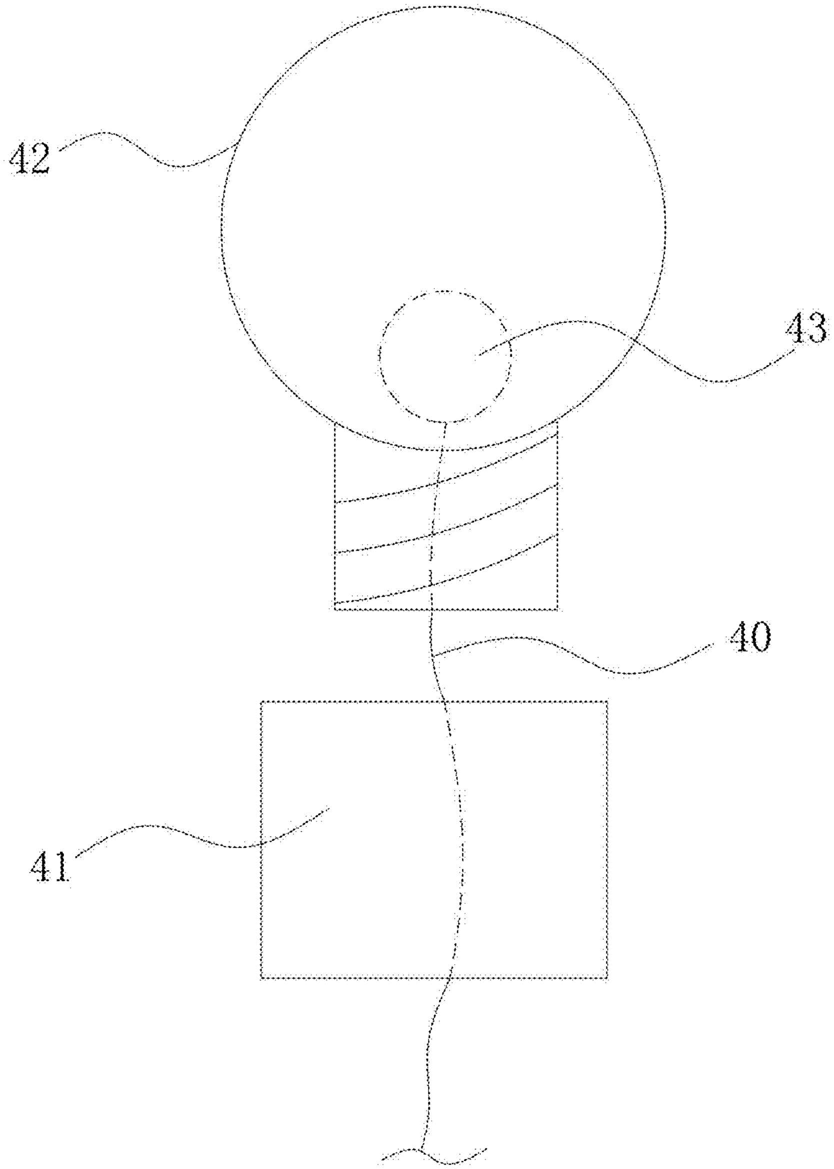
FIG. 10 is an exploded diagram of a lamp source in the example 1.

Referring to FIG. 7 and FIG. 8, in one example, a wire slot 3420 is formed in the bottom of the connection rod 342, the lamp wire 40 is arranged in the wire slot 3420, and the lamp wire 40 can be hidden in the wire slot 3420, so that higher aesthetic property of the whole wind-rotating lamp is achieved.

Four to eight wind-rotating blades 31 are usually arranged, where a connection line between a projection point of an upper end point of one wind-rotating blade 31 on the lower bracket 33 in a vertical direction, and the circle center of the lower bracket 33 is a first connection line, a connection line between a lower end point of the wind-rotating blade 31 and the circle center of the lower bracket 33 is a second connection line, and an angle between the first connection line and the second connection line is 45 to 90 degrees. In the structure, each wind-rotating blade 31 is of a structure which is arranged in an inclined manner, the wind at the same time has a fixed direction, and angles of contact between different positions on the wind-rotating blade 31 and the wind are different, so that the flow guide of the wind on the rotating blade 312 is not only facilitated, but also a rotational speed of the rotating blade 312 and a flow guide speed of the wind on the rotating blade 312 are increased.

Figure 11:
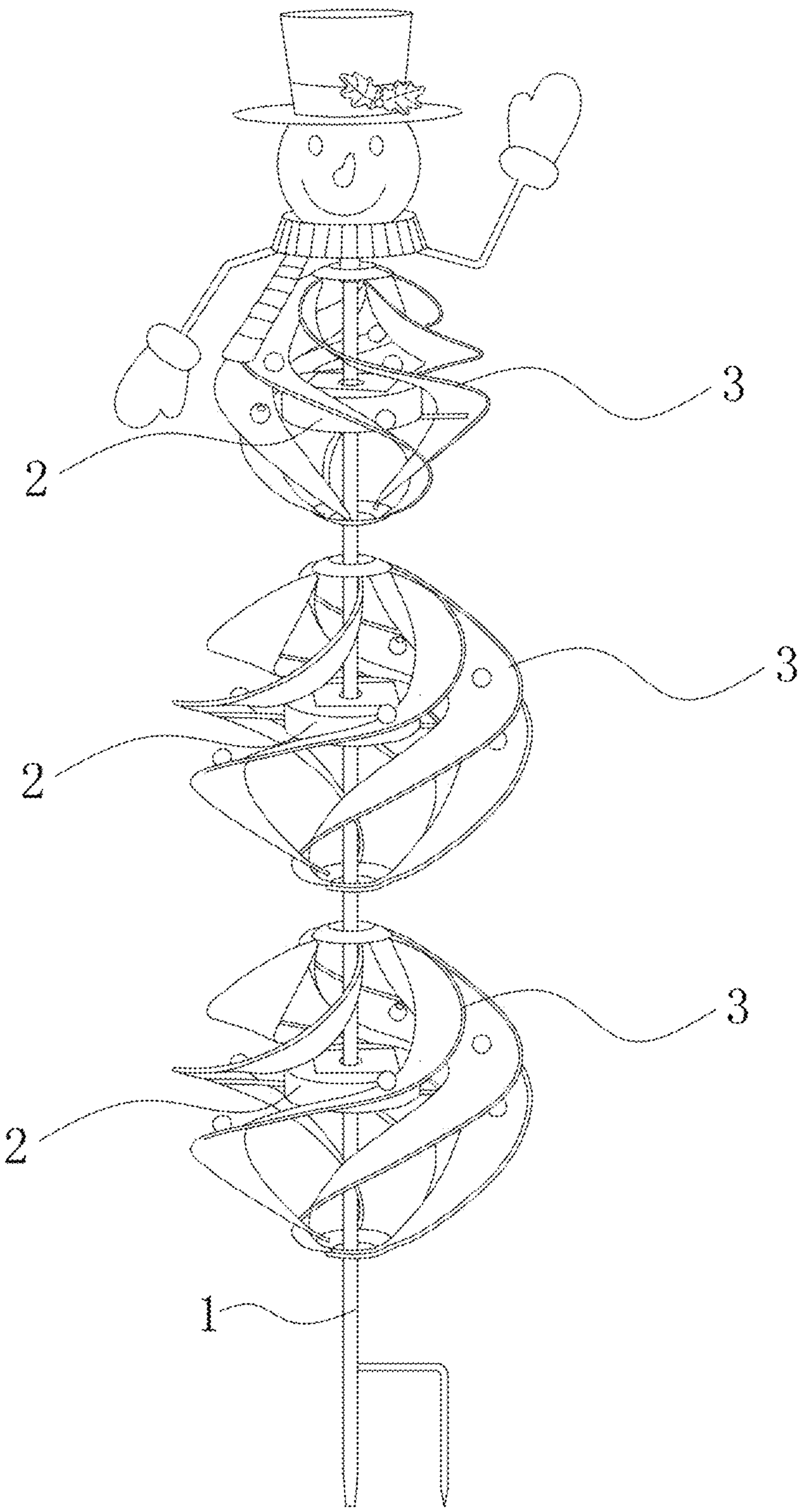
FIG. 11 is a schematic structure diagram that three solar boxes are arranged on the solar wind-rotating lamp, in the example 1.

There may be one, two, three, or even more solar boxes 2 mentioned above, when there may be two or more solar boxes 2, one solar box 2 may also be arranged at the top or bottom of the support rod 1, and referring to FIG. 11, there are three solar boxes 2 of the solar wind-rotating lamp in the drawing.

There may be one, two, three, or even more lamp sources 4 mentioned above, and the lamp sources 4 may also be arranged only on the solar box 2, or may be respectively arranged on the solar box 2 and the support rod 1.

The above bearing 7 is usually installed at the center of the solar box 2, with the gravity center which will not be displaced during rotation, a fourth through hole 20 is formed in the center of the solar box 2, and the bearing 7 is installed in the fourth through hole 20. In one example, the above bearing 7 may also be arranged only on the wind-rotating bracket 3 and not on the solar box 2; and in another example, the bearings 7 are arranged on both the wind-rotating bracket 3 and the solar box 2. One bearing 7 is usually arranged on each solar box 2, but two or more bearings 7 may also be arranged, and two bearings 7 are usually arranged on the wind-rotating bracket 3, but one, three or more bearings 7 may also be arranged.

There may be two, three, or even more sleeve rods 12 mentioned above, and when there are two solar boxes 2, there are usually three sleeve rods 12; when there are three solar boxes 2, there are usually four sleeve rods 12, and so on, the sleeve rod 12 at the bottom is usually fixed to the inner rod 11 in a welded manner, and the solar boxes 2 and the other sleeve rods 12 may be detached from the top; in one example, the sleeve rod 12 at the top may also be fixed to the inner rod 11 in a welded manner, and the solar boxes 2 and the other sleeve rods 12 may be detached from the bottom; and in another example, fixing pieces 6 may also be arranged at both the top and the bottom of the sleeve rod 12, and all the sleeve rods 12 are detachable.

The above fixing piece 6 may also be a clamping buckle or other components, and may also be independently arranged and not on the decoration 8.

An outer contour of the above wind-rotating bracket 3 is of a spherical structure or an ellipsoidal structure, and may also be of a triangular structure, a trapezoidal structure, or other structures.

The above decoration 8 may also be a cartoon, an animal, a scenery or other structures, and may also be arranged on the wind-rotating bracket 3 or at other positions.

The above solar cell panel not only includes a solar panel which absorbs light energy, but also an inverter, and is a well-known component.

The above photoresistor is a well-known component, and can enable the wind-rotating lamp to realize automatic light turning-on at night and automatic light turning-off during the day, and the above photoresistor may also be omitted.

The above insertion rod 14 may also be omitted, the bottom of the above support rod 1 is fixed through inserting the first sharp-cone part 13 into the ground, and the first sharp-cone part 13 may also be omitted.

Figure 12:
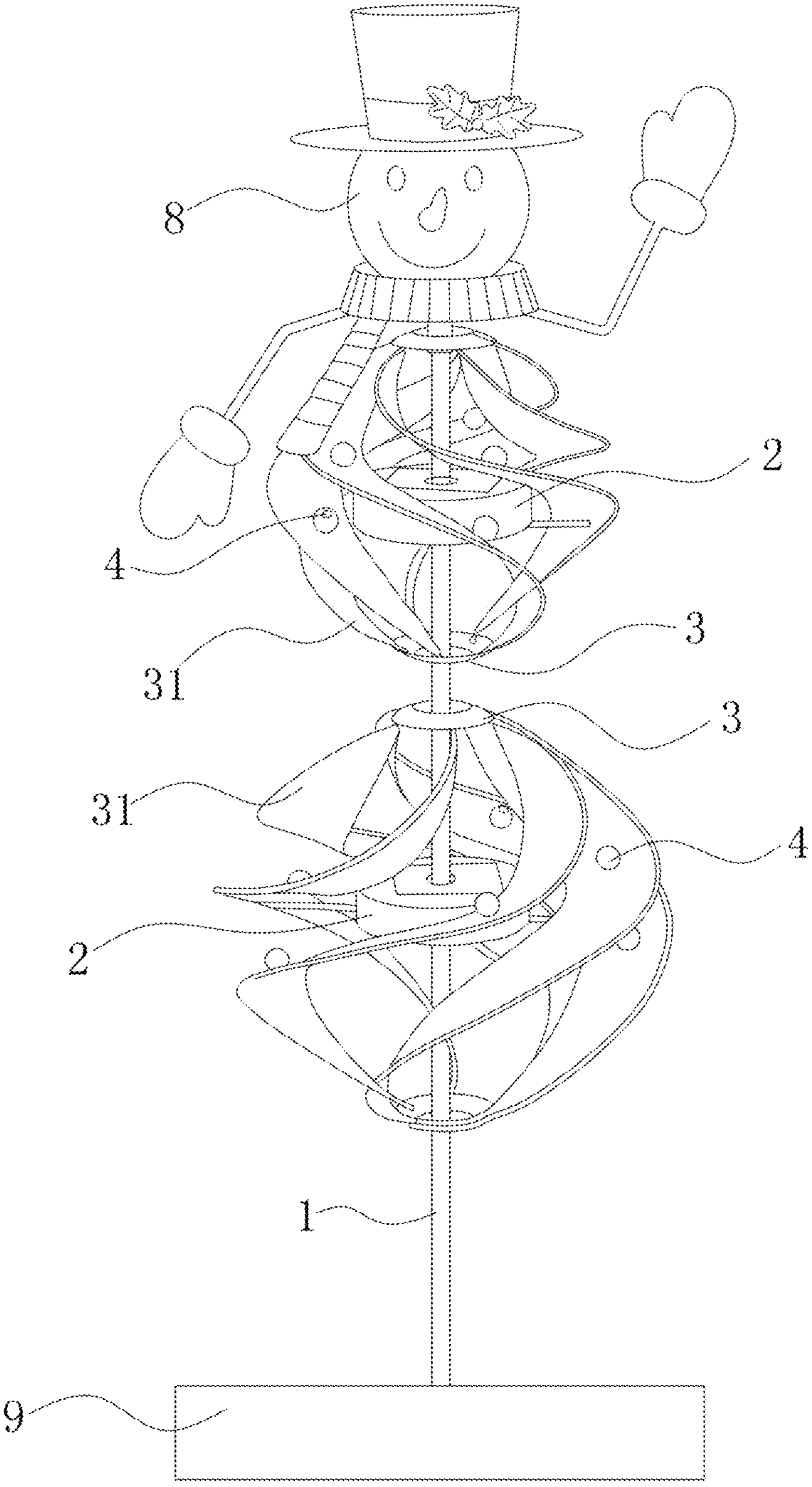
FIG. 12 is a schematic structure diagram that the solar wind-rotating lamp is fixed to a base, in the example 1.

Referring to FIG. 12, in the example of FIG. 12, a base 9 may be arranged at the bottom of support rod 1, and the support rod 1 is fixed to base 9.

The above upper bracket 32 and the above lower bracket 33 are usually arranged to be of an annular structure, and may also be of a rectangular structure, a triangular structure, or other structures.

With regard to the arrangement position of the above solar box 2, the bearing 7 on the solar box 2 is usually arranged at the center, that is, a distance between the bearing 7 and the upper bracket 32, and a distance between the bearing 7 and the lower bracket 33 are equal or close, so that the gravity center of the whole wind-rotating body can be located at the bearing 7, and then higher stability during rotation is achieved, and the case of a local displacement is not easily caused. In one example, the solar box 2 may also be arranged closer to the upper bracket 32 or the lower bracket 33, and in the structure, the upper bracket 32 and the lower bracket 33 have different shaking degrees during rotation, and are relatively low in stability; and in another example, the solar box 2 may also be arranged at the upper bracket 32 or the lower bracket 33.

The above lamp source 4 may also be fixed to the wind-rotating blade 31 through a clamping buckle or a bolt, or in other manners.

Two storage batteries mentioned above are usually arranged, and oppositely arranged in the solar box 2, and due to large mass of the storage batteries, weights of the two storage batteries can be uniformly distributed on solar box 2, so that the case of non-uniform stress during rotation is prevented, and higher stability during rotation is achieved.

A working manner of the example 1 is that:

the support rod 1 is inserted into the ground to be fixed, the whole wind-rotating lamp is in a snowman shape, wind blows the wind-rotating bracket 3 to rotate, and then drives the solar box 2 to rotate, the wind-rotating bracket 3, the solar box 2, and the lamp source 4 form a rotating body which can rotate along the support rod 1, a good light effect is achieved in a rotation process, the whole wind-rotating lamp is high in rotation stability and not prone to shaking and overturning, the bearing 7 plays a role of supporting the support rod 1 to a certain extent, and the support rod 1 is not prone to deformation, and higher in aesthetic property of structure; and during detachment for the wind-rotating lamp, firstly, the decoration 8 is rotated and detached from the top of support rod 1, the sleeve rod 12 at the top is taken out along the inner rod 11 from the top, the solar box 2 and the wind-rotating blade 31 at the top are taken out along the support rod 1 from the top, then, the sleeve rod 12 at the middle part is taken out along the inner rod 11 from the top, and finally, the solar box 2 and the wind-rotating blade 31 at the bottom are taken out along the support rod 1 from the top, and detachment and installation are rapid and convenient, so that packaging, transporting, and maintenance for the wind-rotating lamp are facilitated.

Example 2

Figure 13:
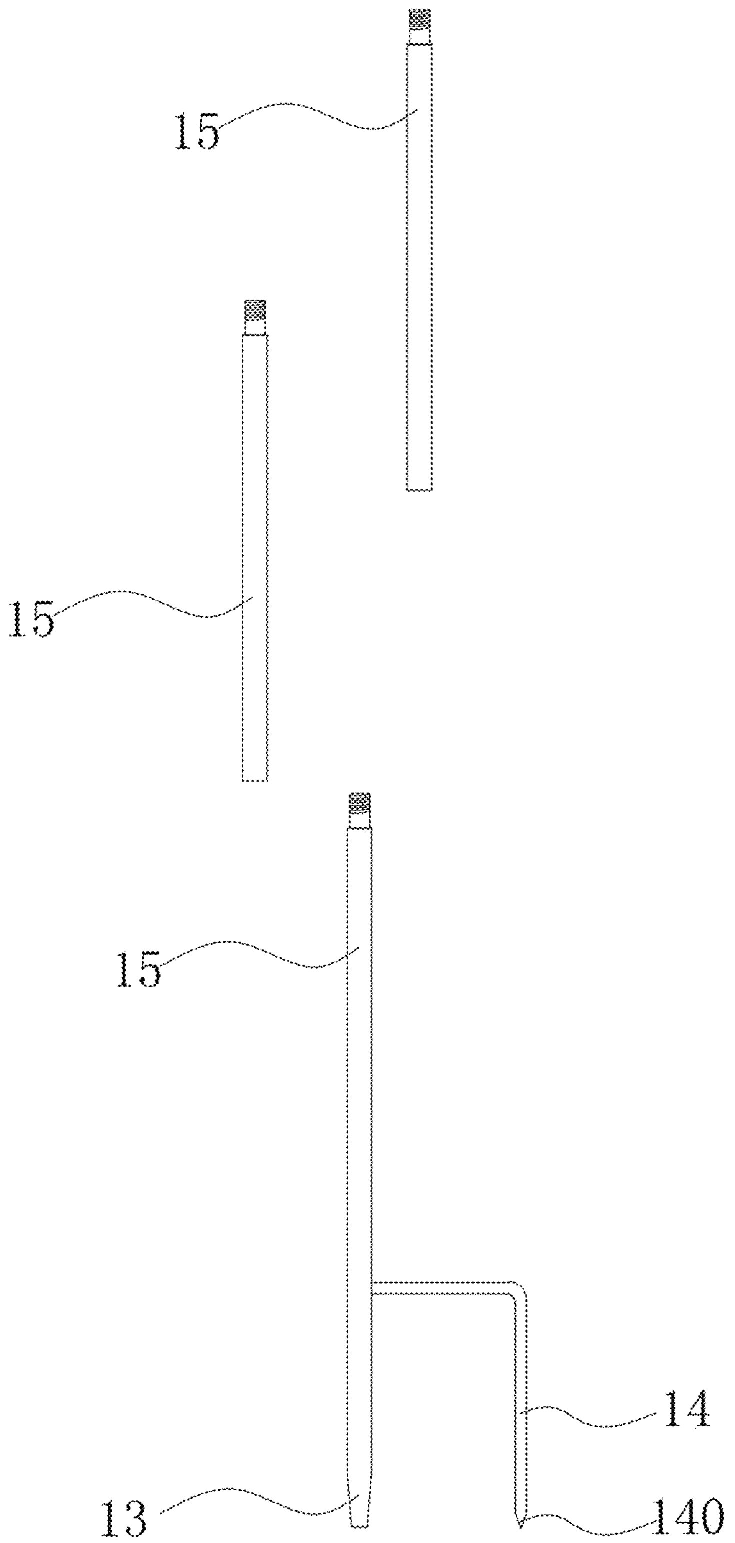
FIG. 13 is an exploded diagram of a support rod in an example 2.

Referring to FIG. 13, a main difference between the example 2 and the example 1 is that: the support rod 1 in the example 2 includes three rod bodies 15 which are detachably connected, two rod bodies 15 are connected through a thread, and the bearing 7 is rotatably fixed between the two rod bodies 15.

The above rod bodies 15 may also be connected through a clamping buckle or other components, and are well-known components.

There may be two, three, or even more rod bodies 15 mentioned above, and the number is specifically set according to a situation.

Example 3

Figure 14:
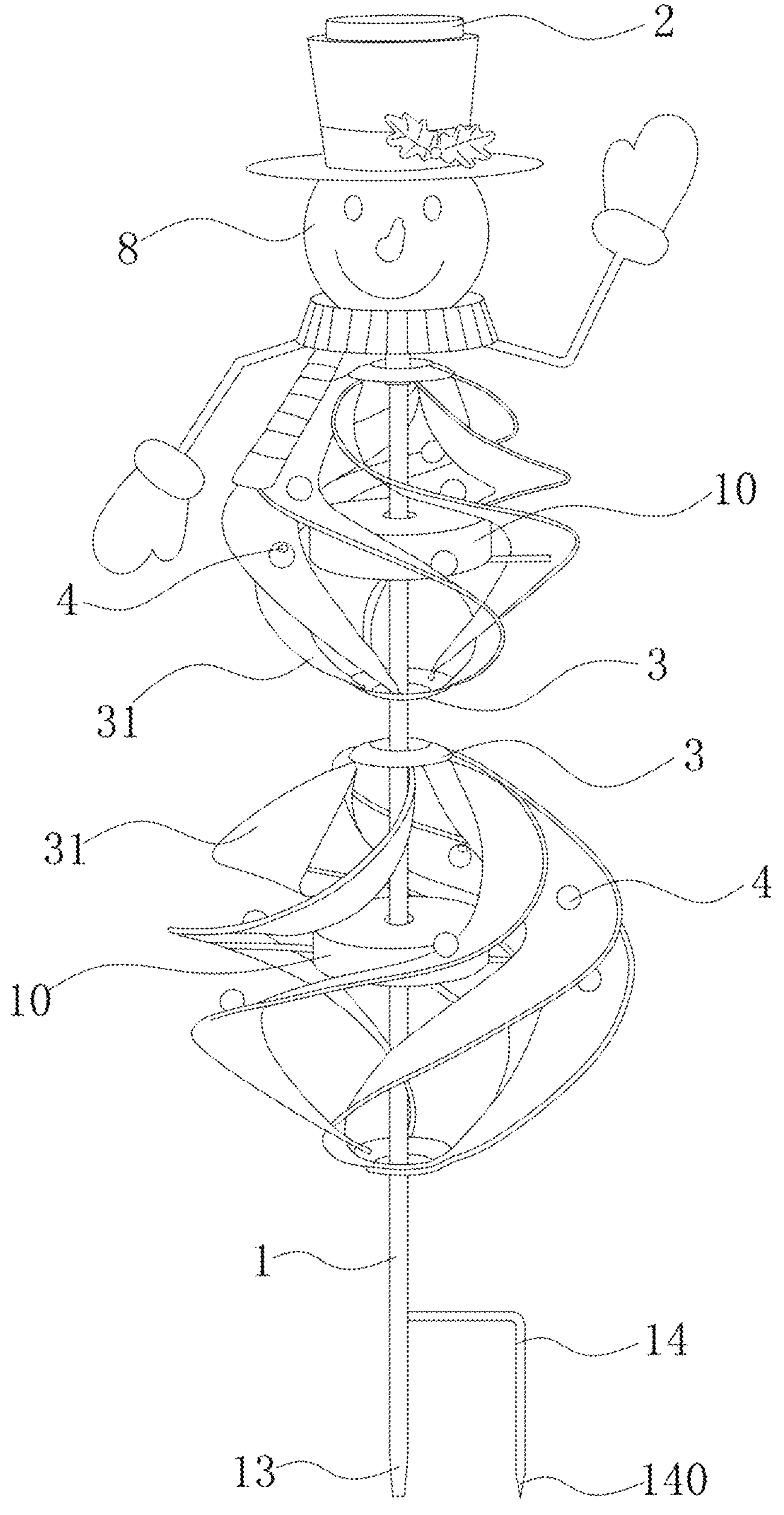
FIG. 14 is a schematic structure diagram of an example 3.

Referring to FIG. 14, a main difference between the example 3 and the example 1 is that: the solar box 2 in the example 3 is arranged on decoration 8, the electric slip ring 10 is arranged on the wind-rotating bracket 3, the bearing 7 is arranged on the electric slip ring 10, and the solar assembly 5 is electrically connected with the lamp source 4 through the electric slip ring 10.

The above electric slip ring 10 is a rotary electric joint which is used for transmitting a power supply for power and a signal power supply during unlimited continuous rotation, and is a well-known component.

The above bearing 7 may also be arranged on the wind-rotating bracket 3.

In the example 3, only one solar box 2 and one solar assembly 5 are usually adopted, a number of the solar boxes 2 and a number of the solar assemblies 5 are reduced, and moreover, the solar box 2 can be located on the decoration 8, so that a better effect of absorbing solar energy is achieved.

Example 4

Figure 15:
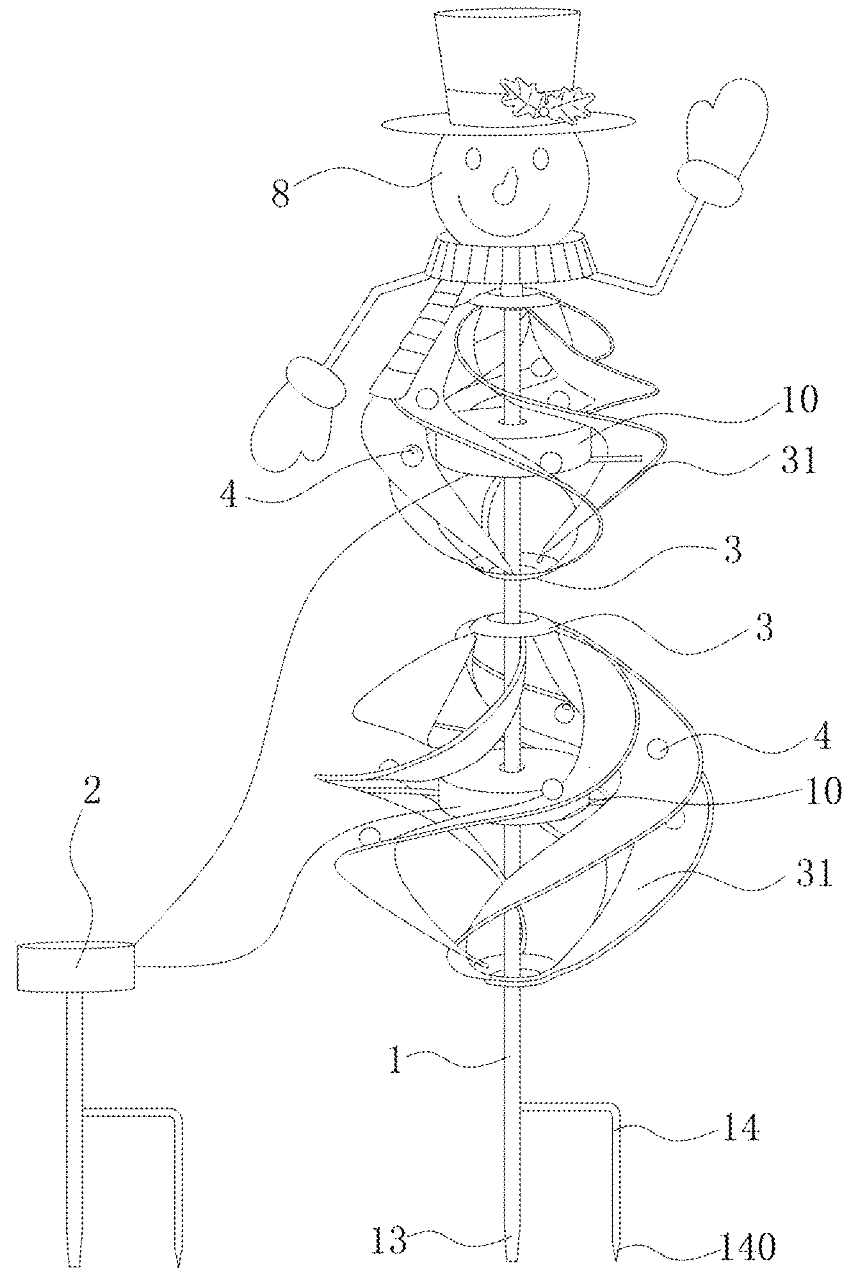
FIG. 15 is a schematic structure diagram of an example 4.

Referring to FIG. 15, a main difference between the example 4 and the example 3 is that: the solar box 2 in the example 4 is arranged in the outside.

There may be one, two, three, or even more solar boxes 2 in the example 4, and each solar box 2 may respectively supply power to the lamp sources 4 on one, two, or more wind-rotating brackets 3.

The above solar box 2 may also be arranged on the support rod 1 or other components.

Example 5

Figure 16:
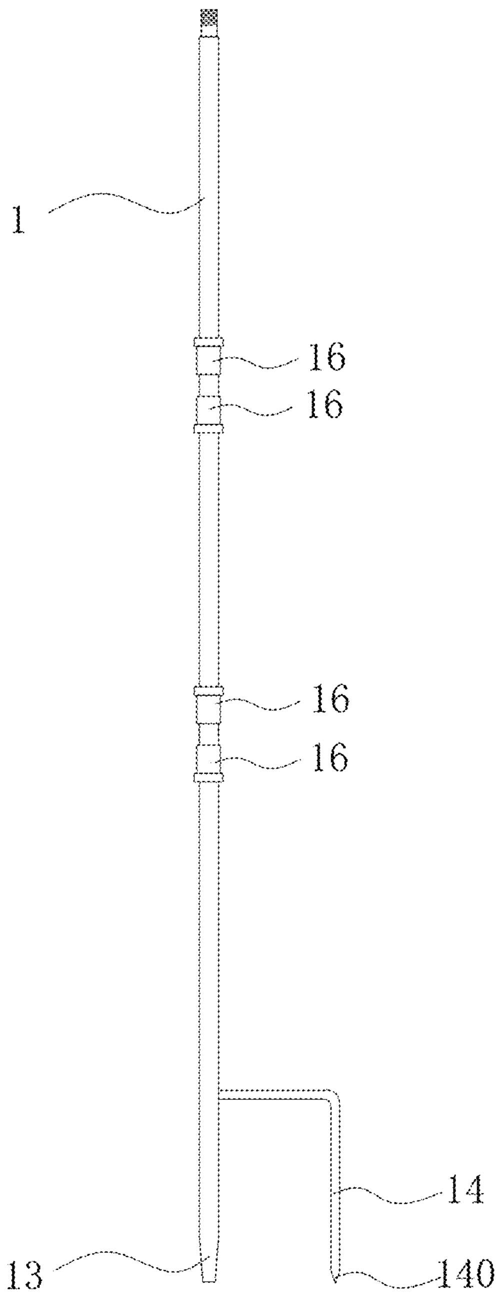
FIG. 16 is a schematic structure diagram of a support rod in an example 5.

Referring to FIG. 16, a main difference between the example 5 and the example 1 is that: two clamping parts are arranged on the support rod 1 in the example 5, the clamping part includes two clamping pieces 16 which are detachably arranged on the support rod 1, the bearing 7 is rotatably clamped between the two clamping pieces 16, and the bearing 7 is rotatably clamped and fixed between the two clamping pieces 16.

The above clamping pieces 16 may be arranged to be detachably fixed to the support rod 1, and may be fixed to the support rod 1 through adopting screws, clamping buckles, or other fixing components.

The above clamping pieces 16 may also be arranged to be non-detachably fixed to the support rod 1.

Although the present invention is specifically demonstrated and introduced in combination with the preferred implementation solutions, those skilled in the art should understand that, various variations may be made on the present invention in form and detail without deviating from the spirit and the scope of the present invention limited by the appended claims, all fall within the protection scope of the present invention.

What is claimed is:

1. A solar wind-rotating lamp, comprising:

at least two solar boxes, each solar box comprising at least one solar assembly comprising at least a solar cell and battery; and at least two wind-rotating brackets coupled to each of the solar boxes, wherein each wind-rotating bracket comprises at least one lamp source, an upper bracket above the solar box, a lower bracket below the solar box, and an installation frame connected to each solar box, wherein the installation frame is arranged between the upper bracket and the lower bracket and is connected to a plurality of wind-rotating blades formed in a spherical or ellipsoidal shape connected to and extending between the upper bracket and the lower brackets;

a bearing arranged on each of the two solar boxes and each wind rotating bracket is fixed to each solar box;

a support rod comprising at least two rod bodies which are detachably connected via another bearing rotatably fixed between the two rod bodies; and wherein a decorative snowman head is arranged at a top of the solar-wind rotating lamp on the support rod, and wherein the support rod passes through openings in each of the upper and lower bracket.

2. The solar wind-rotating lamp according to claim 1, wherein the bearing is arranged on the solar box, the wind-rotating bracket is fixed to the solar box, the solar assembly comprises a solar cell panel, a storage battery, and a photoresistor, and a switch is further arranged on the solar box.

3. The solar wind-rotating lamp according to claim 1, wherein a first sharp-cone part is arranged at the bottom of the support rod, an L-shaped insertion rod is arranged at the bottom of the support rod, and a second sharp-cone part is arranged at the bottom of the insertion rod.

4. The solar wind-rotating lamp according to claim 1, wherein the wind-rotating bracket comprises an upper bracket, a lower bracket, and an installation frame arranged between the upper bracket and the lower bracket, the plurality of wind-rotating blades are connected between the upper bracket and the lower bracket, the installation frame is fixed to the wind-rotating blades, the upper bracket, or the lower bracket, a first through hole is formed in the upper bracket, a second through hole is formed in the lower bracket, a third through hole is formed in the installation frame, the support rod can penetrate through the first through hole, the second through hole and the third through hole, and the wind-rotating blade comprises a support bar connected to the upper bracket and the lower bracket, and a rotating blade arranged on the support bar.

5. The solar wind-rotating lamp according to claim 4, wherein at least two installation parts are arranged on each wind-rotating blade, the lamp sources are detachably fixed to the installation parts, the lamp sources of each wind-rotating blade are respectively connected in series through a lamp wire, the installation part comprises installation holes formed in the wind-rotating blade, the lamp source comprises a lamp holder, a lampshade connected to the lamp holder through a thread, and an LED lamp connected to the lamp wire, the lamp wire penetrates through the lamp holder, and the LED lamp is located in the lampshade.

6. The solar wind-rotating lamp according to claim 5, wherein the installation frame comprises a plate body, and a plurality of connection rods arranged on the plate body, the connection rods are connected to the wind-rotating blades, at least one first location part is arranged on the connection rods, the lamp wires are fixed to the connection rods through the first location part, a plurality of wire threading holes are formed in the plate body, at least one second location part is arranged on the wind-rotating blades, and the lamp wires are fixed to the wind-rotating blades through the second location part.

7. A solar wind-rotating lamp, comprising:

a support rod;

at least one solar box;

at least one electric slip ring;

at least one wind-rotating bracket, the wind-rotating bracket comprising an upper bracket above the solar box, a lower bracket below the solar box, a plurality of wind-rotating blades formed in a spherical or ellipsoidal shape connected to and extending between the upper bracket and the lower brackets, and an electric slip ring between the upper and lower brackets comprising a rotary electric joint connecting the solar assembly with at least one lamp source;

at least one bearing is arranged on the electric slip ring, and rotatably arranged on the support rod in a sleeved manner;

a solar assembly arranged on the solar box and electrically connected with the at least one lamp source through the electric slip ring, wherein the solar assembly comprises at least a solar cell and a battery, and wherein the solar box is located on a top of the solar-wind rotating lamp;

at least one clamping part arranged on an outer wall of the support rod, wherein the bearing is rotatably fixed to the clamping part;

a first through hole formed in the upper bracket, a second through hole is formed in the lower bracket, and wherein the support rod penetrates through the first through hole and the second through hole;

wherein each of the plurality of wind-rotating blades comprises a support bar connected to the upper bracket and the lower bracket, a rotating blade arranged on the support bar, and at least two installation parts comprising holes formed in the wind-rotating blade arranged on each wind-rotating blade, wherein the at least one lamp source is detachably fixed to the installation parts, and wherein at least one wind-rotating blade has at a plurality of lamp sources connected in series through a lamp wire, and wherein the at least one lamp source comprises a lamp holder, a lampshade connected to the lamp holder through a thread, and an LED lamp connected to the lamp wire, wherein the lamp wire penetrates through the lamp holder, and the LED lamp is located in the lampshade.

8. The solar wind-rotating lamp according to claim 7, wherein a decoration is arranged at the top of the support rod, and the solar box is arranged on the decoration.

9. The solar wind-rotating lamp according to claim 7, wherein the solar box is arranged on the support rod or in an outside.

10. The solar wind-rotating lamp according to claim 7, wherein the support rod comprises an inner rod, and at least two sleeve rods arranged on the inner rod in a sleeved manner, the clamping part is formed between the two sleeve rods, the bearing is clamped between the two adjacent sleeve rods, the sleeve rods are fixed to the inner rod through fixing pieces, the support rod comprises at least two rod bodies which are detachably connected, the clamping part is formed between the two rod bodies, the bearing is rotatably clamped and fixed between the two rod bodies, the clamping part comprises two clamping pieces which are detachably arranged on the support rod, and the bearing is rotatably clamped between the two clamping pieces.

11. The solar wind-rotating lamp according to claim 7, wherein a first sharp-cone part is arranged at the bottom of the support rod, an L-shaped insertion rod is arranged at the bottom of the support rod, and a second sharp-cone part is arranged at the bottom of the insertion rod.

* * * * *